US010908319B2

(12) United States Patent
Ogane

(10) Patent No.: US 10,908,319 B2
(45) Date of Patent: Feb. 2, 2021

(54) ANTIREFLECTION FILM, AND OPTICAL MEMBER AND OPTICAL APPARATUS EACH USING THE ANTIREFLECTION FILM

(71) Applicant: CANON KABUSHIKI KAISHA, Tokyo (JP)

(72) Inventor: Masanobu Ogane, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 15/494,972

(22) Filed: Apr. 24, 2017

(65) Prior Publication Data

US 2017/0315269 A1 Nov. 2, 2017

(30) Foreign Application Priority Data

May 2, 2016 (JP) .................. 2016-092306

(51) Int. Cl.
*G02B 1/115* (2015.01)
*C03C 17/34* (2006.01)
(Continued)

(52) U.S. Cl.
CPC ............ *G02B 1/115* (2013.01); *C03C 17/007* (2013.01); *C03C 17/25* (2013.01); *C03C 17/34* (2013.01); *G02B 1/118* (2013.01); *G02B 27/0018* (2013.01); *C03C 2217/465* (2013.01); *C03C 2217/478* (2013.01); *C03C 2217/73* (2013.01); *C03C 2218/113* (2013.01); *C03C 2218/116* (2013.01); *C03C 2218/31* (2013.01); *G02B 2207/109* (2013.01)

(58) Field of Classification Search
CPC .... G02B 1/115; G02B 1/118; G02B 27/0018; G02B 2207/109; C03C 17/007; C03C 17/25; C03C 17/34; C03C 2217/465; C03C 2217/478; C03C 2217/73; C03C 2218/113; C03C 2218/116; C03C 2218/31
USPC .......................................... 359/601
See application file for complete search history.

(56) References Cited

U.S. PATENT DOCUMENTS

2006/0132922 A1* 6/2006 Takao ............... G02B 1/10
359/601
2008/0176038 A1* 7/2008 Zhang ............... C03C 1/008
428/141

(Continued)

FOREIGN PATENT DOCUMENTS

JP 61-51283 B2 11/1986
JP 9-202649 A 8/1997

(Continued)

OTHER PUBLICATIONS

Notification of Reasons for Refusal in Japanese Application No. 2016-092306 (dated Mar. 3, 2020).

*Primary Examiner* — Zachary W Wilkes
*Assistant Examiner* — Mitchell T Oestreich
(74) *Attorney, Agent, or Firm* — Venable LLP

(57) ABSTRACT

Provided are an antireflection film having a high antireflection effect in a broad band, including, on a substrate, in this order: a particle layer containing particles; and a layer having a textured structure containing aluminum oxide as a main component, in which the particle layer has an aluminum oxide textured structure between the particles, and an optical member and an optical apparatus each using the antireflection film.

15 Claims, 5 Drawing Sheets

(51) Int. Cl.
*C03C 17/00* (2006.01)
*C03C 17/25* (2006.01)
*G02B 1/118* (2015.01)
*G02B 27/00* (2006.01)

(56) References Cited

U.S. PATENT DOCUMENTS

| | | |
|---|---|---|
| 2012/0207973 A1 | 8/2012 | Sakai et al. |
| 2013/0222916 A1 | 8/2013 | Ogane |
| 2015/0103226 A1* | 4/2015 | Takahashi .............. G02B 1/118 348/335 |
| 2016/0061998 A1 | 3/2016 | Sakai et al. |

FOREIGN PATENT DOCUMENTS

| | | |
|---|---|---|
| JP | 2001-233611 A | 8/2001 |
| JP | 2008-139581 A | 6/2008 |
| JP | 2012-118501 A | 6/2012 |
| JP | 2012-185495 A | 9/2012 |
| JP | 2015-135445 A | 7/2015 |

\* cited by examiner

ANTIREFLECTION FILM, AND OPTICAL MEMBER AND OPTICAL APPARATUS EACH USING THE ANTIREFLECTION FILM

BACKGROUND OF THE INVENTION

Field of the Invention

The present invention relates to an antireflection film having a high antireflection effect in a broad band, and an optical member and an optical apparatus each using the antireflection film.

Description of the Related Art

An optical element, for example, a lens, to be included in an optical system is produced using a transparent material, for example, optical glass or an optical plastic. Such transparent material has a high refractive index, and hence has a high reflectance. When the reflectance is high, an effective amount of light that reaches an image surface is decreased, and moreover, a ghost or a flare occurs owing to unnecessary reflection. Accordingly, the optical element formed of the transparent material needs to have an antireflection function imparted thereto.

As a technique for imparting the antireflection function to the optical element, there is generally known a multilayer antireflection film in which a plurality of layers of thin-film dielectric films are stacked on a surface of the transparent material in accordance with optical interference theory. Such antireflection film is formed by a dry method (vacuum film formation method), for example, a vapor deposition method or a sputtering method, or a wet method (wet film formation method), for example, a dipping method or a spin coating method. For such antireflection film produced in accordance with optical interference theory, there has been proposed a method of forming the antireflection film, involving appropriately selecting kinds of a high-refractive-index thin film and a low-refractive-index thin film and their respective thicknesses to virtually obtain a medium refractive index (Japanese Patent Application Laid-Open No. S61-51283).

Meanwhile, as a technique that provides an even higher antireflection effect than that of such antireflection film, there has been proposed a fine structural body in which a plurality of textured structure as fine as a wavelength of incident light (hereinafter referred to as "use wavelength") are formed on a surface.

In the case of a textured structure finer than the use wavelength, incident light cannot recognize the textured structure and behaves as if the fine structural body was a uniform medium. That is, the structural body formed of the fine textured structure has a refractive index corresponding to a volume ratio of a material forming the textured structure, and exhibits a refractive index so low as to be impossible to obtain with a general material. Accordingly, such textured structure body can be used to provide higher antireflection performance than that of the antireflection film formed of a high-refractive-index material and a low-refractive-index material.

A fine structural body for providing high antireflection performance at a wavelength within or below a visible light region is known to exhibit excellent antireflection performance when formed with an appropriate pitch and height. In addition, it is known that the antireflection performance can be improved even in a near-infrared region by increasing the height of the fine structural body (Japanese Patent Application Laid-Open No. 2012-118501).

As a method of forming the fine structural body, there is known, for example, application of a film having dispersed therein fine particles each having a particle diameter equal to or smaller than the wavelength. In addition, a method of forming a fine structure, involving forming a pattern with a fine processing apparatus (e.g., an electron beam lithography apparatus, a laser interference exposure apparatus, a semiconductor exposure apparatus, or an etching apparatus), enables control of the pitch and the height. In addition, it is known that a fine structural body having excellent antireflection performance can be formed by such method.

Besides the foregoing, there is also known a method involving growing boehmite, which is aluminum oxide hydroxide, on a substrate to provide an antireflection effect. In such method, film formation is performed by a vacuum film formation method or a liquid-phase method (sol-gel method), followed by drying or firing. The film of aluminum oxide thus produced is subjected to water vapor treatment or warm water immersion treatment to convert a surface layer of the film to boehmite, to thereby form a fine structure, and thus an antireflection film is obtained (Japanese Patent Application Laid-Open No. H09-202649).

In the method of forming the fine structure, involving performing warm water immersion treatment to convert the surface layer to boehmite, aluminum oxide is eluted from the surface to form the fine structure. In addition, a constraint is imposed by a substrate, and hence a layer configured to support the fine structure is formed between the substrate and the fine structure.

SUMMARY OF THE INVENTION

However, the content disclosed in Japanese Patent Application Laid-Open No. S61-51283 has a problem in that the broadband reflectance characteristic of the antireflection film is poor. In addition, the antireflection effect of such antireflection film significantly depends on its thickness. When an actual thickness deviates from a design thickness, an effective antireflection effect is not obtained. Accordingly, there is a problem in that high-precision thickness control is required, and hence the reduction of production cost is restricted.

In addition, in the case of the method involving forming a fine pattern with a fine processing apparatus as disclosed in Japanese Patent Application Laid-Open No. 2012-118501, such pattern forming method generally requires extremely large-scale equipment, and hence requires an extremely expensive equipment investment. Further, although the method is suitable for the formation of the pattern on a flat surface, the method has a problem in that it is extremely difficult to form the pattern on a complicated shape, for example, a curved surface. The method is not suitable for application to a general-purpose optical element, such as a lens.

In addition, it is known that in the method of forming an antireflection film through the use of a fine structural body of an aluminum compound disclosed in Japanese Patent Application Laid-Open No. H09-202649, a reflectance for each of vertical incidence and oblique incidence is extremely low, and excellent antireflection performance is obtained. However, protrusions are grown by repeating dissolution and reprecipitation of aluminum oxide, and hence when a certain height is reached or surpassed, the dissolution and the reprecipitation reach an equilibrium. Consequently, the growth of the protrusions stops, and the height of the structural body cannot be increased. Accordingly, there is a problem in that the fine structural body cannot be formed to have a height needed for the prevention of reflection in a broad band. In addition, the disclosed fine structural body gradually becomes thicker from an air side toward a substrate side, and hence the refractive index of the surface of a member including the fine structural body smoothly changes. With this, the reflection of light from the surface can be prevented. However, a layer of aluminum oxide having a high refractive index remains between the substrate and the fine structure, and hence the refractive index of the fine structural body abruptly changes at the remaining layer of aluminum oxide. Therefore, even when a layer is formed under the fine structural body so that the refractive index may smoothly change, the thickness of the layer in which the refractive index smoothly changes cannot be increased owing to the remaining alumina layer. Accordingly, there is a problem in that a broadband antireflection structural body cannot be formed.

According to one embodiment of the present invention, there is provided an antireflection film, including, on a substrate, in this order: a particle layer containing particles; and a layer having a textured structure containing aluminum oxide as a main component, in which the particle layer has an aluminum oxide textured structure between the particles.

Further, according to embodiments of the present invention, there are provided an optical member and an optical apparatus each using the antireflection film.

In addition, according to one embodiment of the present invention, there is provided a production method for the antireflection film.

According to the present invention, the antireflection film having a high antireflection effect in a broad band, and the optical member and the optical apparatus each using the antireflection film can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(Antireflection Film)

Figure 1:
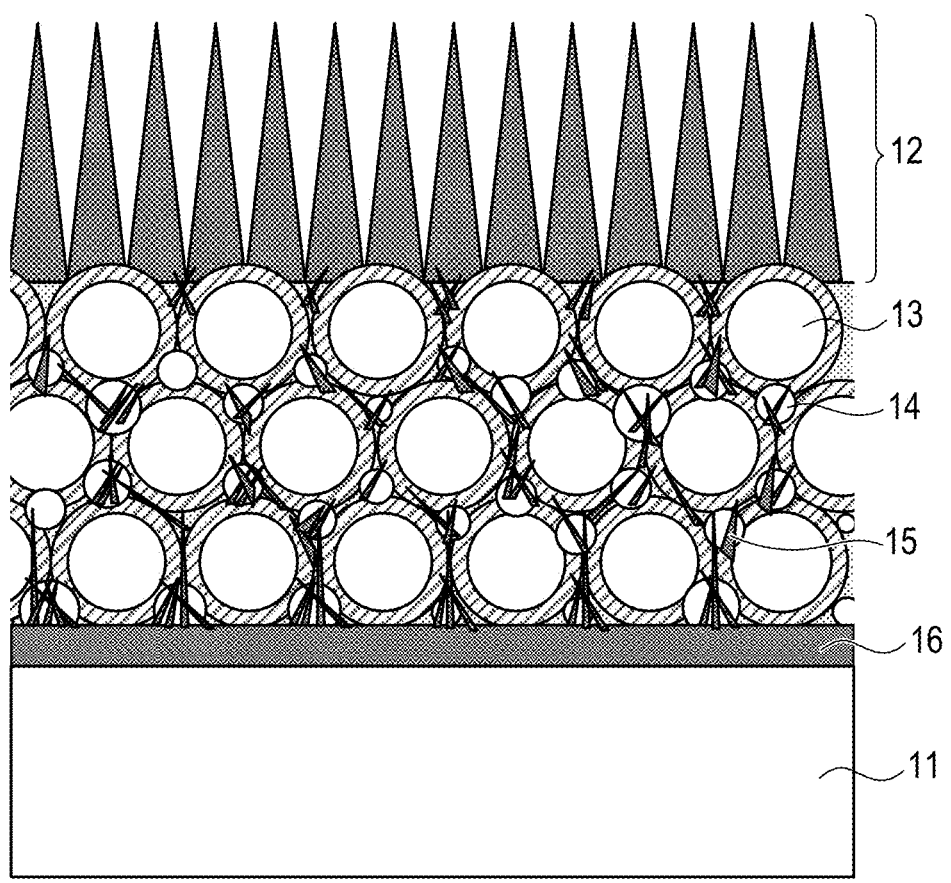
FIG. 1 is a schematic view for illustrating an antireflection film according to one embodiment of the present invention.

FIG. 1 is a schematic view for illustrating an antireflection film according to one embodiment of the present invention.

On a substrate 11, there is an antireflection film including a particle layer containing particles and a layer of a textured structure 12 formed of protrusions of aluminum oxide in this order. The particles are preferably hollow particles 13. The particle layer has an aluminum oxide textured structure 15 between the particles therein (in a void 14). An aluminum oxide layer 16 may be present between the substrate 11 and the particle layer.

The textured structure 12 of aluminum oxide is formed from a crystal of an oxide or a hydroxide of aluminum, or a hydrate thereof. The crystal is particularly preferably boehmite. In the present application, the oxide or the hydroxide of aluminum, or the hydrate thereof is referred to as "aluminum oxide".

The textured structure 12 of aluminum oxide is a nanostructure in which an apparent refractive index lower than the intrinsic refractive index of aluminum oxide changes in the thickness direction of the film. With this, the reflection of light from the surface can be prevented.

Under the textured structure 12, the particle layer containing the hollow particles 13 is preferably present.

The hollow particles 13 each have a pore inside the particle, and each have a shell on the outer periphery of the pore. By virtue of air (refractive index: 1.0) contained in the pore, the refractive index of the particle layer can be decreased. The pore may be a single pore or a plurality of pores, and may be appropriately selected. As a material for forming each of the hollow particles 13, one having a low refractive index is preferred, and an inorganic material, such as $SiO_2$, $MgF_2$, or a fluorine compound, or an organic resin, such as a silicone resin, may be used. Of those, $SiO_2$ or $MgF_2$ is preferably used, and $SiO_2$, which allows easy production of the hollow particles 13, is more preferably used. As a production method for the hollow particles 13 each formed of $SiO_2$, the hollow particles 13 may be produced by a method disclosed in, for example, Japanese Patent Application Laid-Open No. 2001-233611 or Japanese Patent Application Laid-Open No. 2008-139581. By virtue of the hollow particles 13, the refractive index of the particle layer can be decreased.

The thickness of the particle layer is preferably 100 nm or more and 145 nm or less. When the thickness of the particle layer is less than 100 nm, a reflectance in a visible region is decreased but a reflectance in an infrared region is increased. When the thickness of the particle layer is more than 145 nm, the reflectance in the infrared region is decreased but the reflectance in the visible region is increased.

The average particle diameter of the hollow particles 13 is preferably 15 nm or more and 100 nm or less, more preferably 15 nm or more and 60 nm or less. In the case where the average particle diameter of the hollow particles 13 is less than 15 nm, it is difficult to stably produce particles serving as cores. In addition, the case where the average particle diameter is more than 100 nm is not preferred because scattering due to the sizes of the hollow particles 13 occurs.

The average particle diameter of the hollow particles 13 refers to an average Feret diameter. The average Feret diameter may be measured through image processing of an image observed as a transmission electron micrograph. As an image processing method, a processing method based on commercially available image analysis software, for example, image Pro PLUS (manufactured by Media Cybernetics, Inc.) may be used. The average particle diameter of the hollow particles 13 is determined by calculating an average value for the Feret diameters of the hollow particles 13 measured in a predetermined image region with, if necessary, appropriate contrast adjustment.

The thickness of the shell of each of the hollow particles 13 is preferably 10% or more and 50% or less, more preferably 20% or more and 35% or less of the average particle diameter of the hollow particles 13. The case where the thickness of the shell is less than 10% is not preferred because the strengths of the hollow particles 13 become insufficient. In addition, the case where the thickness of the shell is more than 50% is not preferred because the effect of the hollow particles 13 does not remarkably appear in the refractive index.

In the particle layer formed by the stacking of the hollow particles 13, the void 14 is present between the particles. That is, as illustrated in FIG. 1, in the case of spherical particles, the particle layer is not completely filled with the particles and the void 14 is formed. The void 14 can be utilized to decrease the refractive index of the particle layer.

The refractive index of the textured structure 12 of aluminum oxide serving as a surface layer on the substrate 11 side (base portion) is lower than the intrinsic refractive index of aluminum oxide because of its structure. Accordingly, when a layer (on the substrate 11 side) present under the textured structure 12 of aluminum oxide has a high refractive index, a smooth refractive index difference cannot be obtained due to a refractive index difference from the textured structure 12 of aluminum oxide, with the result that a broadband antireflection characteristic is not obtained. Therefore, through the use of the hollow particles for the particle layer as a layer present under the textured structure 12 of aluminum oxide having a low apparent refractive index, the refractive indices of the two layers can be made closer to each other, and hence a broadband antireflection characteristic can be obtained as a whole.

The void 14 is formed by the stacking of the hollow particles 13, and hence the aluminum oxide layer 16 present under the particle layer and the outermost surface of the particle layer spatially communicate to each other through the void 14.

The aluminum oxide textured structure 15 is present between the particles in the particle layer (in the void 14). The aluminum oxide textured structure 15 is similar to the textured structure 12 of aluminum oxide present at the outermost surface layer, and is formed between the particles in the particle layer (in the void 14). The aluminum oxide textured structure 15 in the present invention refers to a crystal structural body to be formed in the space between the particles (the void 14) through dissolution and precipitation of aluminum oxide.

That is, the aluminum oxide textured structure 15 is formed through the dissolution of aluminum oxide from the aluminum oxide layer 16 present under the particle layer, and the precipitation of the aluminum oxide in the space between the particles (the void 14). As described above, the space between the particles in the particle layer (in the void 14) is continuous from the surface of the aluminum oxide layer 16 to the surface layer of the particle layer. Accordingly, the aluminum oxide textured structure 15, while receiving a supply of aluminum ion from the aluminum oxide layer 16, repeats dissolution and precipitation in the space between the particles (the void 14), and is finally precipitated on a surface on the particle layer, to thereby form the textured structure 12 of aluminum oxide. The aluminum oxide textured structure 15 is formed based on such mechanism, and hence the aluminum oxide textured structure 15 in the particle layer is present more abundantly in a site closer to the aluminum oxide layer 16. Accordingly, it is considered that the refractive index in the particle layer can be smoothly changed, and an optical member including the antireflection film of the present invention can achieve a broadband antireflection characteristic.

The aluminum oxide layer 16 is a layer that may remain on the substrate 11 after aluminum oxide has been supplied for the formation of the textured structure 12 of aluminum oxide and the aluminum oxide textured structure 15.

(Production Method for Antireflection Film)

Figure 2A:
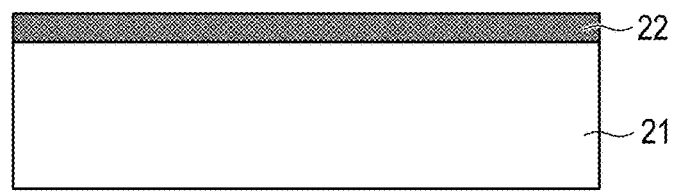
FIG. 2A, FIG. 2B, and FIG. 2C are views for illustrating the steps of a production method for the antireflection film according to one embodiment of the present invention.
Figure 2B:
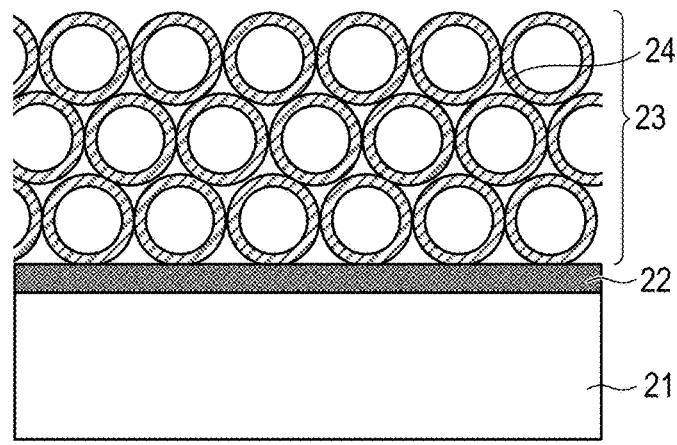
Figure 2C:
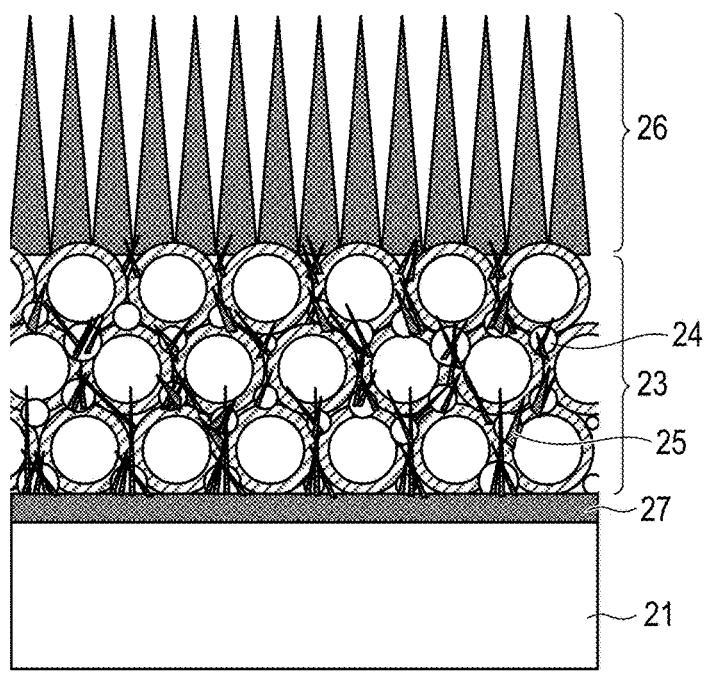

Next, a production method for the antireflection film of the present invention is described. FIG. 2A to FIG. 2C are views for illustrating the steps of a production method for the antireflection film according to one embodiment of the present invention.

The production method for the antireflection film of the present invention is as described below. First, an aluminum oxide layer 22 is formed on a desired substrate 21 (FIG. 2A), and a particle layer having a void 24 between hollow particles 23 is formed on the aluminum oxide layer 22 (FIG. 2B). After that, through immersion in warm water at 50° C. or more or exposure to water vapor, the warm water or the water vapor, which passes through the space between the particles in the particle layer (the void 24) in the particle layer, hydrates and dissolves aluminum oxide in the aluminum oxide layer 22, and the aluminum oxide is reprecipitated. Through the reprecipitation of aluminum oxide, while an aluminum oxide textured structure 25 is formed between the particles in the particle layer (in the void 24), a textured structure 26 of aluminum oxide is formed on a surface on the particle layer (FIG. 2C). In this production method, the dissolution and the precipitation of aluminum oxide are an equilibrium reaction, and hence the formation of the structure of the antireflection film of the present invention is completed under a state in which the dissolution and the precipitation have reached an equilibrium. At this time, when the aluminum oxide layer 22 that has not been dissolved completely remains on the substrate 21, an aluminum oxide layer 27 is formed, and thus the antireflection film of the present invention is formed.

As the substrate 21 to be used for the antireflection film of the present invention, glass, a resin, or the like may be used. In addition, the shape of the substrate 21 is not limited, and the substrate 21 may have a flat surface, a curved surface, a concave surface, a convex surface, or a film shape.

The aluminum oxide layer 22 may be formed by any of the known methods, such as: a gas-phase method, for example, CVD or PVD; a liquid-phase method, for example, a sol-gel method; and hydrothermal synthesis involving using an inorganic salt.

In order to form a uniform antireflection layer on the substrate 21 even when the substrate 21 has a large area and/or a non-flat surface shape, the method of forming the aluminum oxide layer 22 is preferably a forming method involving applying a sol-gel coating liquid.

For a raw material for a gel film containing aluminum oxide to be obtained from the sol-gel coating liquid, there is used an aluminum compound serving as a precursor of aluminum oxide, or the aluminum compound and at least one kind of respective compounds of Zr, Si, Ti, Zn, and Mg. For example, as raw materials for $Al_2O_3$, $ZrO_2$, $SiO_2$, $TiO_2$, ZnO, and MgO, their respective metal alkoxides or salt compounds, such as chlorides and nitrates, may be used. From the viewpoint of the film formability of the gel film, metal alkoxides are preferably used particularly as raw materials for metal oxides such as $ZrO_2$, $SiO_2$, and $TiO_2$.

Examples of the aluminum compound serving as the precursor of aluminum oxide include aluminum alkoxides, such as aluminum ethoxide, aluminum isopropoxide, aluminum-n-butoxide, aluminum-sec-butoxide, and aluminum-tert-butoxide, aluminum acetylacetonate, or oligomers thereof, aluminum salts, such as aluminum nitrate, aluminum chloride, aluminum acetate, aluminum phosphate, and aluminum sulfate, and aluminum hydroxide.

The organic solvent to be used for the sol-gel coating liquid only needs to be an organic solvent that does not cause the gelation of the raw material, such as the alkoxide, before application. Examples of the organic solvent include: alcohols, such as methanol, ethanol, 2-propanol, butanol, ethylene glycol, and ethylene glycol-mono-n-propyl ether; and various aliphatic or alicyclic hydrocarbons, such as n-hexane, n-octane, cyclohexane, cyclopentane, and cyclooctane. Examples of the organic solvent also include: various aromatic hydrocarbons, such as toluene, xylene, and ethylbenzene; various esters, such as ethyl formate, ethyl acetate, n-butyl acetate, ethylene glycol monomethyl ether acetate, ethylene glycol monoethyl ether acetate, and ethylene glycol monobutyl ether acetate; various ketones, such as acetone, methyl ethyl ketone, methyl isobutyl ketone, and cyclohexanone; various ethers, such as dimethoxyethane, tetrahydrofuran, dioxane, and diisopropyl ether; various chlorinated hydrocarbons, such as chloroform, methylene chloride, carbon tetrachloride, and tetrachloroethane; and aprotic polar solvents, such as N-methylpyrrolidone, dimethylformamide, dimethylacetamide, and ethylene carbonate. Of the above-mentioned various solvents, alcohols are preferably used from the viewpoint of the stability of the solution.

When a metal alkoxide is used as the raw material for the aluminum oxide layer 22, in particular, when an alkoxide of aluminum, zirconium, or titanium is used, such material has high reactivity to water and is rapidly hydrolyzed owing to moisture in air or the addition of water, to thereby cause white turbidity and precipitation in the solution, and hence attention is needed. In addition, when a metal chloride is used as the raw material for the aluminum oxide layer 22, in particular, when an aluminum salt compound, a zinc salt compound, or a magnesium salt compound is used, such material is difficult to dissolve with only an organic solvent, and hence the stability of the solution is low. In order to cope with the high reactivity of the metal alkoxide or the low solubility of the metal chloride, a stabilizer is preferably added to stabilize the solution.

Examples of the stabilizer may include: β-diketone compounds, such as acetylacetone, dipivaloylmethane, tri fluoroacetylacetone, hexafluoroacetylacetone, benzoylacetone, and dibenzoylmethane; β-ketoester compounds, such as methyl acetoacetate, ethyl acetoacetate, allyl acetoacetate, benzyl acetoacetate, isopropyl acetoacetate, tert-butyl acetoacetate, isobutyl acetoacetate, 2-methoxyethyl acetoacetate, and methyl 3-keto-n-valerate; and alkanolamines, such as monoethanolamine, diethanolamine, and triethanolamine. The addition amount of the stabilizer is preferably set to a molar ratio of about 1 with respect to the metal alkoxide or the metal salt compound. In addition, after the addition of the stabilizer, in order to form suitable precursors of aluminum oxide and a metal oxide, a catalyst is preferably added for the purpose of promoting part of the reaction.

Examples of the catalyst may include nitric acid, hydrochloric acid, sulfuric acid, phosphoric acid, acetic acid, and ammonia. As a method of applying the sol-gel coating liquid onto the substrate 21, any of the known application means, such as a dipping method, a spin coating method, a spray method, a printing method, a flow coating method, and combinations thereof, may be appropriately adopted.

The sol-gel coating liquid is applied onto the substrate 21 and subjected to heat treatment, to thereby form the aluminum oxide layer 22 on the substrate 21. A heat treatment temperature preferably falls within the range of 120° C. or more and 230° C. or less. As the heat treatment temperature increases, the density of the film can be more easily increased. However, when the heat treatment temperature is more than 230° C., damage, such as deformation, occurs in the substrate 21. The heat treatment temperature is more preferably 150° C. or more and 210° C. or less. A heating time, which varies depending on the heating temperature, is preferably 10 minutes or more.

Next, an application liquid having dispersed therein the hollow particles 23 (hereinafter sometimes referred to as "application liquid of the hollow particles") is applied onto the substrate 21 having the aluminum oxide layer 22 formed thereon to form the particle layer.

In the step of applying the hollow particles 23, it is preferred that an application liquid having only the hollow particles 23 dispersed in a solvent be applied onto the aluminum oxide layer 22. When only the hollow particles 23 are formed into a film, the arrangement property of the hollow particles 23 can be improved without being impaired by a binder or the like, and thus a particle layer having a uniform space between the particles (void 24) can be formed.

The hollow particles 23 to be used for the application liquid each preferably have a surface subjected to surface modification with a methyl group or the like because a viscosity as a slurry is decreased. Accordingly, in the case of hollow silica particles, as a precursor for forming a wall of the hollow particles 23, a trifunctional silane modified with a methyl group, for example, methyltriethoxysilane or methyltrimethoxysilane, is preferably used. In addition, as a material to be used for the precursor, the trifunctional silane and a tetrafunctional silane, for example, tetraethoxysilane, may be used as a mixture thereof, and it is preferred that a composition capable of realizing stable particle production be selected.

As the solvent to be used for the application liquid of the hollow particles, a solvent having satisfactory affinity for the hollow particles 23 is preferably used. The case where a solvent having low affinity for the hollow particles 23 is used is not preferred because the hollow particles 23 are aggregated in the application liquid.

As a suitable solvent to be used for the application liquid of the hollow particles, a solvent having a boiling point of 100° C. or more and 200° C. or less is preferably used. Specifically, for example, 1-methoxy-2-propanol, 2-ethyl-1-butanol, methyl cellosolve, ethyl cellosolve, butyl cellosolve, or a mixed solvent thereof may be used.

The concentration of the hollow particles 23 contained in the application liquid is desirably low within a range in which film formation can be performed with a desired thickness. When the solid content concentration is high, the viscosity of the application liquid is increased, and hence the arrangement property of the hollow particles 23 is decreased. In addition, the dispersion state of the hollow particles 23 is deteriorated, and hence it is difficult to form a uniform void 24 in the particle layer. Accordingly, the film formation is preferably performed under such a condition that the film formation can be performed under a state of a lower solid content concentration.

In addition, as a method of forming a film using the application liquid for the hollow particles, for example, any of the known application means, such as a dipping method, a spin coating method, a spray method, a printing method, a flow coating method, and combinations thereof, may be appropriately adopted.

The substrate 21 having the particle layer formed on the aluminum oxide layer 22 is subjected to drying or heat treatment, and is subjected to immersion treatment in warm water or exposed to water vapor. Thus, a plate-like crystal containing aluminum oxide as a main component is precipitated to form the textured structure 26 of aluminum oxide serving as the outermost surface. Through the immersion in the warm water, the surface layer of the aluminum oxide layer 22, which is a gel film containing aluminum oxide, is subjected to a deflocculating action or the like, and thus some components thereof are eluted. Due to a difference between the solubilities of hydroxides derived from various metal oxides in the warm water, the plate-like crystal containing aluminum oxide as a main component is precipitated and grown on the surface layer of the particle layer, and in the space between the hollow particles 23 (the void 24). Thus, the antireflection film of the present invention can be formed. The temperature of the warm water is preferably set to 40° C. or more and 100° C. or less, and the temperature of the water vapor is preferably set to 100° C. or more and 120° C. or less. The time period of each of the warm water treatment and the water vapor exposure is preferably set to from 5 minutes to 24 hours.

In the above-mentioned embodiment, the refractive index of the particle layer is determined by the hollow particles 23, the void 24, and the aluminum oxide textured structure 25. However, after the formation of the textured structure 26 of aluminum oxide at the outermost surface, a binder capable of permeating the hollow particles 23 of the particle layer and the space between the hollow particles 23 (the void 24) may be applied for, for example, refractive index adjustment for adjusting the wavelength dependence of the particle layer, or other fouling prevention.

In the application of the binder or a component for generating the binder, the hollow particles 23 and the space between the hollow particles 23 (the void 24) can be filled with the binder while the arrangement property of the particle layer is maintained.

As the component of the binder, a metal alkoxide, a resin coating material, a fluorine compound, or the like may be formed into a film, and a binder having a property similar to that of the material for each of the particles of the particle layer is preferred. For example, when the material for each of the particles in the particle layer is silica, a silane alkoxide is preferably used as the component of the binder. With regard to the concentration of the binder, film formation only needs to be performed at a concentration providing a desired content for the refractive index of the formed particle layer and a desired function thereof, for example, fouling prevention. The concentration may be appropriately selected depending on the binder component, a solvent, and film formation conditions. In addition, it is preferred that a solvent having satisfactory affinity for the binder be appropriately selected as the solvent to be used for the application.

With regard to a method of applying the binder, film formation is performed again after the film formation of the hollow particles 23, and hence an immersion method like dip coating is not preferred because detachment of the hollow particles 23 that have adhered occurs. No particular limitation is imposed except for the foregoing, and a general application method for a liquid-state application liquid, for example, a spin coating method or a spray coating method, may be used. From the viewpoint of the detachment of the hollow particles 23 described above, and in order to perform the film formation with a uniform thickness on the substrate 21 having a curved surface, for example, a lens, the coating material is preferably formed into a film by a spin coating method. In addition, the film formation of the binder may be performed using a plurality of liquid-state application liquids in accordance with the expression of a desired function.

In the above-mentioned embodiment, the aluminum oxide layer 22 is directly formed on the substrate 21. However, one or a plurality of layers of other metal oxides may be formed between the substrate 21 and the aluminum oxide layer 22. As a high refractive index layer or a medium refractive index layer, for example, zirconium oxide, titanium oxide, tantalum oxide, niobium oxide, hafnium oxide, alumina, silica, or magnesium fluoride may be formed, and the film formation may be performed by a vapor deposition method, sputtering, or the like.

The refractive index layer and the layer having functionality may be formed by a vacuum vapor deposition method, a sputtering method, a CVD method, a dip coating method, a spin coating method, a spray coating method, or the like.

(Optical Member and Optical Apparatus)

An optical member of the present invention may be any optical member as long as the optical member includes the antireflection film of the present invention. The optical member is preferably an optical member including the antireflection film of the present invention on the surface of the substrate 21. Examples of such optical member may include a polarizing plate, a lens, a prism, an optical filter, a sensor, an antireflection plate, and a protective cover. An optical apparatus of the present invention may be any optical apparatus as long as the optical apparatus has incorporated thereinto the optical member of the present invention. Such optical apparatus can be used for various displays of a word processor, a computer, a television, a plasma display panel, and the like, various cameras, such as a still camera, a video camera, and a surveillance camera, binoculars, a telescope, a liquid crystal projector, a laser printer, a solar cell, and the like.

Now, the present invention is more specifically described by way of Examples. The present invention is not limited to Examples below, and various modifications are possible without departing from the gist of the present invention.

Example 1

In Example 1, an optical member including the antireflection film of the present invention was produced and evaluated by the following methods.

(Aluminum Oxide Precursor Sol)

14.8 g of aluminum-sec-butoxide (ASBD, manufactured by Kawaken Fine Chemicals Co., Ltd.), 3-methyl-2,4-pentanedione serving as a stabilizer in an amount of 0.5 molar equivalent to the aluminum-sec-butoxide, and 2-ethylbutanol were mixed and stirred to uniformity. 0.01 M dilute hydrochloric acid was dissolved in a 2-ethylbutanol/1-ethoxy-2-propanol mixed solvent, and then the solution was slowly added to the solution of the aluminum-sec-butoxide. The mixture was stirred for a while. The solvent was adjusted so as to finally be 59.3 g of a mixed solvent having a mixing ratio of 2-ethylbutanol and 1-ethoxy-2-propanol of 7/3. Further, the resultant was stirred in an oil bath at 120° C. for 2 hours to prepare an aluminum oxide precursor sol.

(Hollow Particle-Dispersed Coating Material)

As a first application liquid, a hollow particle-dispersed coating material having dispersed therein hollow silica (solid content concentration: 3.80 mass %) was prepared by the following method.

[First Step]

50 g of 1-ethoxy-2-propanol (hereinafter "1E2P") was loaded into a 500 cc recovery flask in advance. After that, 200 g of a hollow silica sol (Thrulya 1110, manufactured by JGC Catalysts and Chemicals Ltd.) having a solid content concentration of hollow particles of 20.5 mass % and using isopropyl alcohol (hereinafter "IPA") as a solvent was added, and 136 g of 1E2P was further added. The mixed liquid was reduced in pressure to 60 hPa and increased in temperature to 45° C. to be concentrated. The concentration was continued for 30 minutes, and as a result, the weight of the liquid became 205 g.

[Second Step]

To the liquid obtained in the first step, 1E2P, 1-butoxy-2-propanol (hereinafter "1B2P"), and 2-ethyl-1-butanol (hereinafter "2E1B") were added so that the addition amounts of the respective solvents 1E2P:1B2P:2E1B were 38:31:31. The resultant coating material had a surface tension of 27.06 dynes/cm. The resultant diluted liquid was stirred for 30 minutes to be turned into a hollow particle-dispersed coating material for film formation. 5 g of the coating material was taken and heated to 1,000° C., and its solid content weight concentration was measured and found to be 3.805%. In addition, the remaining amount ratio of IPA was detected using a gas chromatograph manufactured by Shimadzu Corporation, and was found to be less than 5%.

(Film Formation)

A disc-like glass substrate whose glass material was BK7, which had only one surface polished, the other surface being like frosted glass, and which had a size of about 940 mm and a thickness of about 2 mm was subjected to ultrasonic cleaning in an alkali detergent, and then dried in an oven. Onto the polished surface of the cleaned disc-like glass substrate, the aluminum oxide precursor sol was dropped in an appropriate amount and applied at 4,500 rpm for 30 seconds by a spin coating method. After that, heating treatment was performed in a hot air circulating oven at 140° C. for 30 minutes to coat the substrate with an amorphous aluminum oxide layer. On the substrate coated with the amorphous aluminum oxide film, the hollow particle-dispersed coating material was formed into a film by a spin coating method at 3,000 rpm for 60 seconds to provide a substrate having a particle layer made of hollow silica having a thickness of 119 nm formed on the amorphous aluminum oxide layer. The substrate was immersed in warm water at 75° C. for 20 minutes. Thus, an optical member of this Example was obtained.

The reflectance of the optical member of this Example in the wavelength range of from 400 nm to 1,600 nm at an angle of incidence of 5° was measured with a spectrophotometer (manufactured by Hitachi High-Technologies Corporation, U-4000). At this time, the frosted surface side was painted over with a black permanent marker, and the measurement was performed under a state free of back surface reflection.

Figure 3:
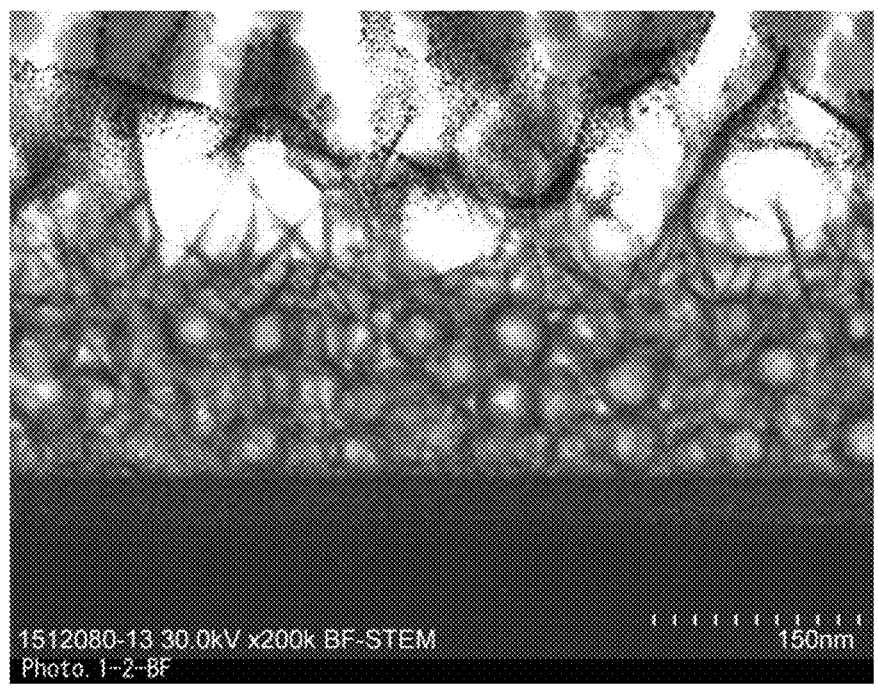
FIG. 3 is a photograph (magnification: 200,000 times) of a cross-section of the antireflection film of the present invention observed with a scanning transmission electron microscope.

The optical member of this Example was subjected to cross-sectional observation. The optical member was cut in the cross-section direction of the substrate to a thickness of 100 nm with a focused ion beam apparatus (manufactured by SII NanoTechnology Inc., SMI3200F). The state of the cross-section was subjected to transmission observation of a dark field of view with a scanning transmission electron microscope (manufactured by Hitachi High-Technologies Corporation, S-5500) in a field of view at a magnification of 200,000 times. The result is shown in FIG. 3.

It was found that in the optical member of this Example, an aluminum oxide layer remained on the substrate, a particle layer was formed thereon, and a textured structure of aluminum oxide was formed in the particle layer. Further, it was found that a layer formed of a textured structure of petal-shaped aluminum oxide was formed on the surface of the particle layer.

Comparative Example 1

In Comparative Example 1, an antireflection film was formed on a substrate whose glass material was BK7 as in Example 1 by performing multilayer film formation of $MgF_2$, $SiO_2$, $Ta_2O_5$, and $Al_2O_3$ in this order from the outermost surface layer by a vapor deposition method. The optical member formed by the vapor deposition method was measured for its reflectance in the same manner as in Example 1.

Comparative Example 2

In Comparative Example 2, an optical member in which the particle layer was not formed in Example 1 was produced. That is, the optical member of Comparative Example 2 was obtained through the same steps as in Example 1 except that the particle layer was not formed. The optical member of Comparative Example 2 was measured for its reflectance in the same manner as in Example 1.

(Evaluation)

Figure 4:
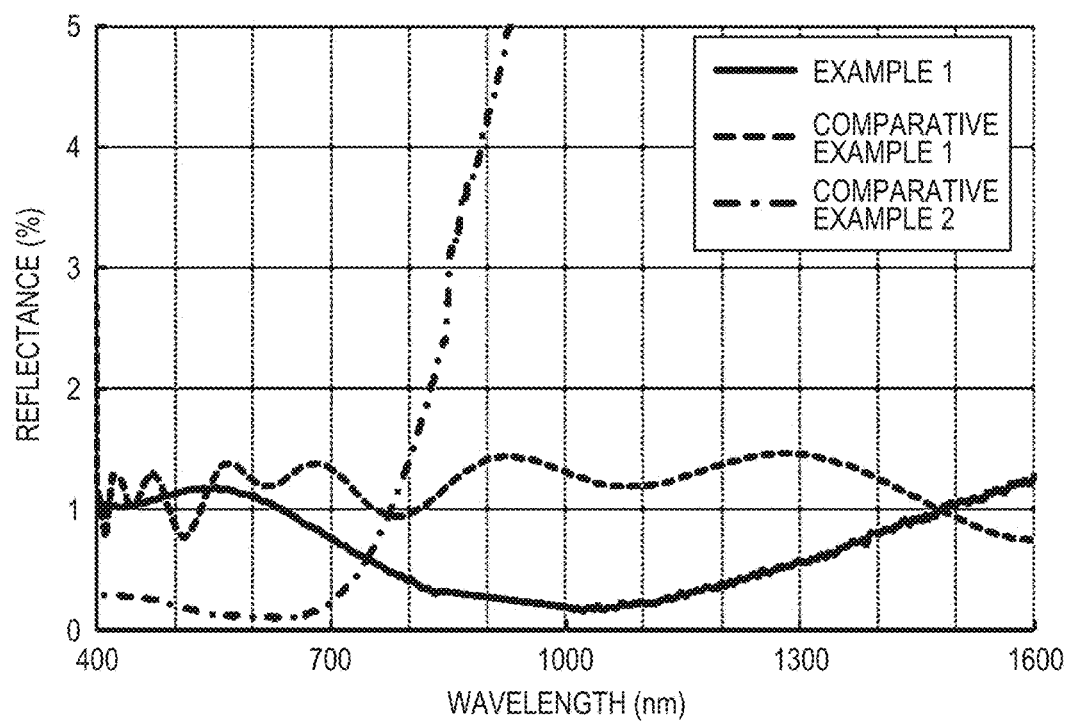
FIG. 4 is a graph for showing a relationship of the reflectance (%) of each of optical members produced in Example 1, Comparative Example 1, and Comparative Example 2 to the wavelength (nm) of light.

The reflectance measurement results of the optical members produced in Example 1, Comparative Example 1, and Comparative Example 2 are shown in FIG. 4. It was found that the optical member of Example 1 was able to achieve a satisfactory reflectance characteristic in a visible to infrared broadband wavelength range as compared to the optical member of each of Comparative Example 1 and Comparative Example 2.

Example 2

In Example 2, two kinds of optical members including antireflection films including particle layers having different thicknesses were produced.

After a substrate had been coated with an amorphous aluminum oxide film in the same manner as in Example 1, an application liquid of hollow particles was formed into a film by a spin coating method for 60 seconds at each of 2,000 rpm and 4,000 rpm. As a result, substrates having particle layers made of hollow particles having thicknesses of 142 nm and 105 nm formed on the amorphous aluminum oxide film were obtained. Each of the substrates was immersed in warm water at 75° C. for 20 minutes to provide an optical member of this Example.

(Evaluation)

Figure 5:
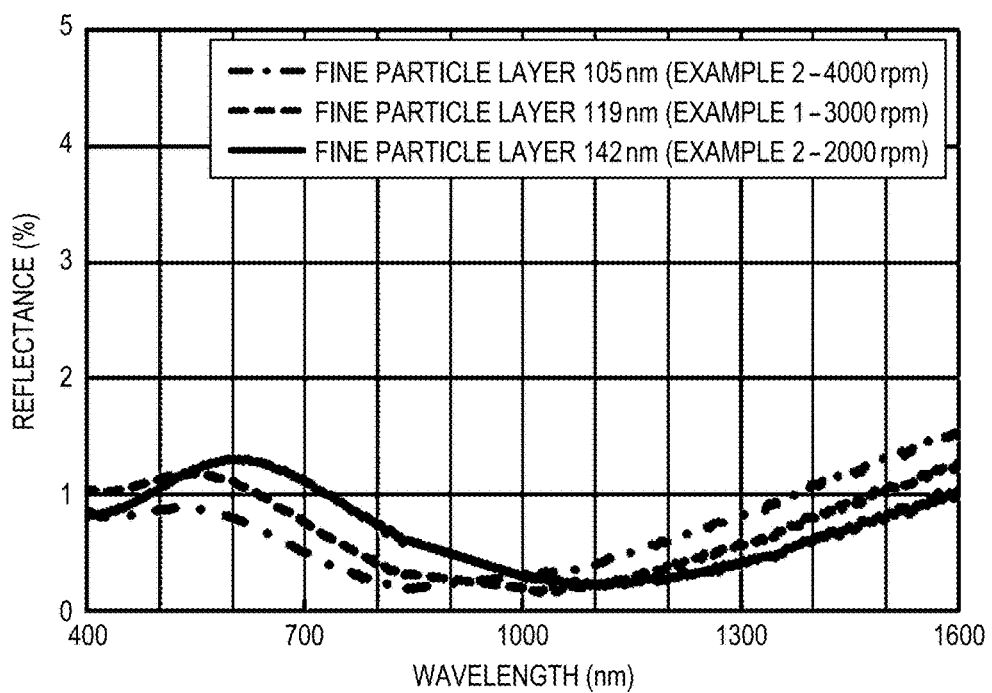
FIG. 5 is a graph for showing a relationship of the reflectance (%) of each of the optical member produced in Example 1 and Example 2 to the wavelength (nm) of light.

As in Example 1, the measurement results of reflectance are shown in FIG. 5. The optical member in which the particle layer formed at 2,000 rpm had a thickness of 142 nm was able to serve as an optical member satisfactory in an infrared region as compared to Example 1. In addition, the optical member in which the particle layer formed at 4,000 rpm had a thickness of 105 nm was able to serve as an optical member satisfactory in a visible region as compared to Example 1.

Example 3

(Film Formation)

In this Example, an optical member was obtained in the same manner as in Example 1 except that S-LAH55V (manufactured by Ohara Inc.) was used as a substrate.

(Evaluation)

Figure 6:
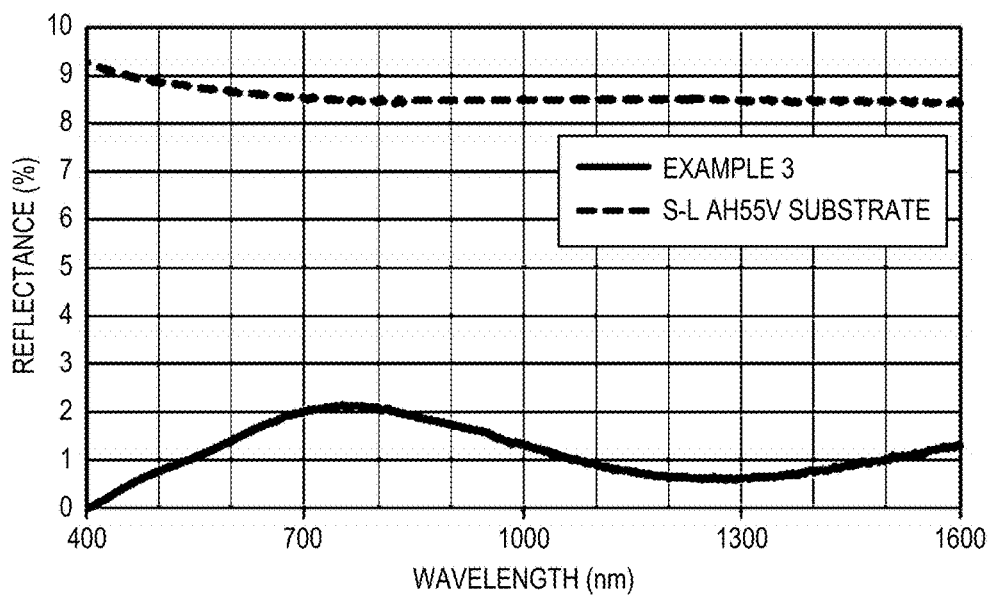
FIG. 6 is a graph for showing a relationship of the reflectance (%) of each of an optical member produced in Example 3 and an S-LAH55V substrate used therein to the wavelength (nm) of light.

As in Example 1, the measurement result of the reflectance of the optical member of Example 3, and the reflectance of the S-LAH55V substrate used in Example 3 are shown in FIG. 6. The optical member of Example 3 was able to achieve a satisfactory reflectance over a visible to infrared region.

Example 4

In Example 4, an optical member including the antireflection film of the present invention was produced and evaluated by the following methods.

(Silica Precursor Sol)

6.0 g of a hydrolyzed condensate of a silane alkoxide (manufactured by Honeywell, ACCUGLASS T-11(111), solid content concentration: 4.50 mass %) was diluted with 12.0 g of 2-ethyl-1-butanol (manufactured by Tokyo Chemical Industry Co., Ltd., grade: EP) to prepare a silica precursor sol (solid content concentration: 1.50 mass %).

(Film Formation)

In this Example, an optical member was obtained in the same manner as in Example 1 except that S-LAH55V (manufactured by Ohara Inc.) was used as a substrate. On the antireflection film of the resultant optical member, the silica precursor sol was formed into a film by a spin coating method at 2,200 rpm for 60 seconds. Thus, an optical member including an antireflection film having its refractive index adjusted through the formation of a binder in a hollow particle layer was obtained.

(Evaluation)

Figure 7:
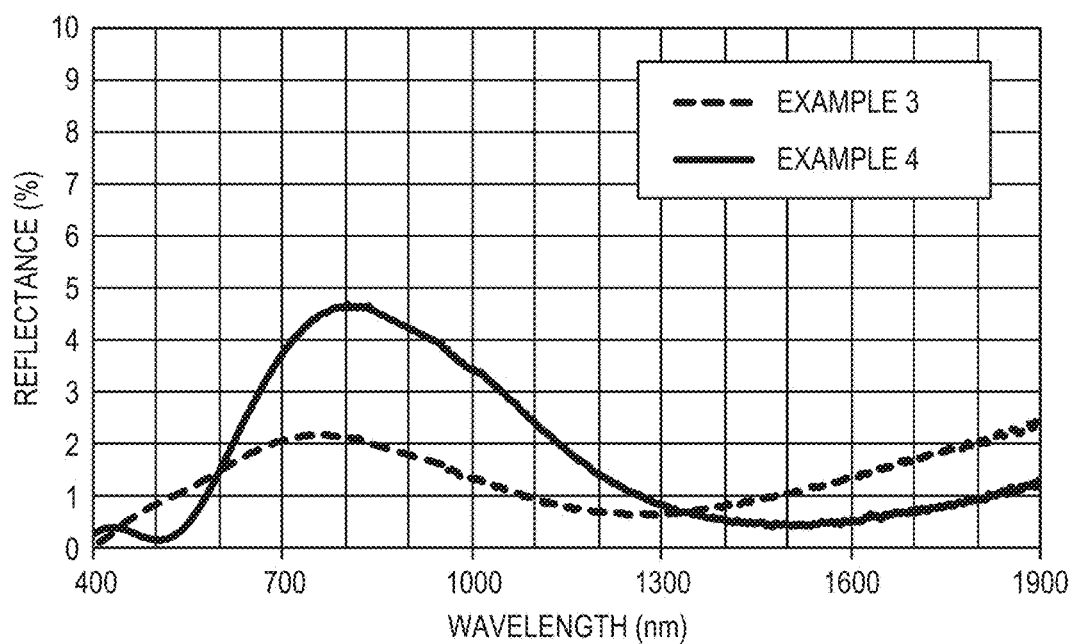
FIG. 7 is a graph for showing a relationship of the reflectance (%) of each of the optical member produced in Example 3 and Example 4 to the wavelength (nm) of light.

As an evaluation of the optical member of this Example, reflectance evaluation was performed in the same manner as in Example 1 except that the wavelength range of from 400 nm to 1,900 nm was used. The measurement result of the reflectance of the optical member of Example 4 and the reflectance of the optical member of Example 3 are shown in FIG. 7. The optical member of Example 4 was able to achieve a more satisfactory reflectance than that of Example 3 over a visible region, i.e., the wavelength region of from 400 nm to 600 nm, and an infrared region of 1,300 nm or more.

Comparative Example 3

In Comparative Example 3, an optical member was obtained by forming, in the optical member of Example 1, a hydrolyzed condensate of a silane alkoxide (manufactured by Honeywell, ACCUGLASS T-11(111)) into a film by a spin coating method at 3,000 rpm for 60 seconds instead of forming the particle layer.

(Evaluation)

Figure 8:
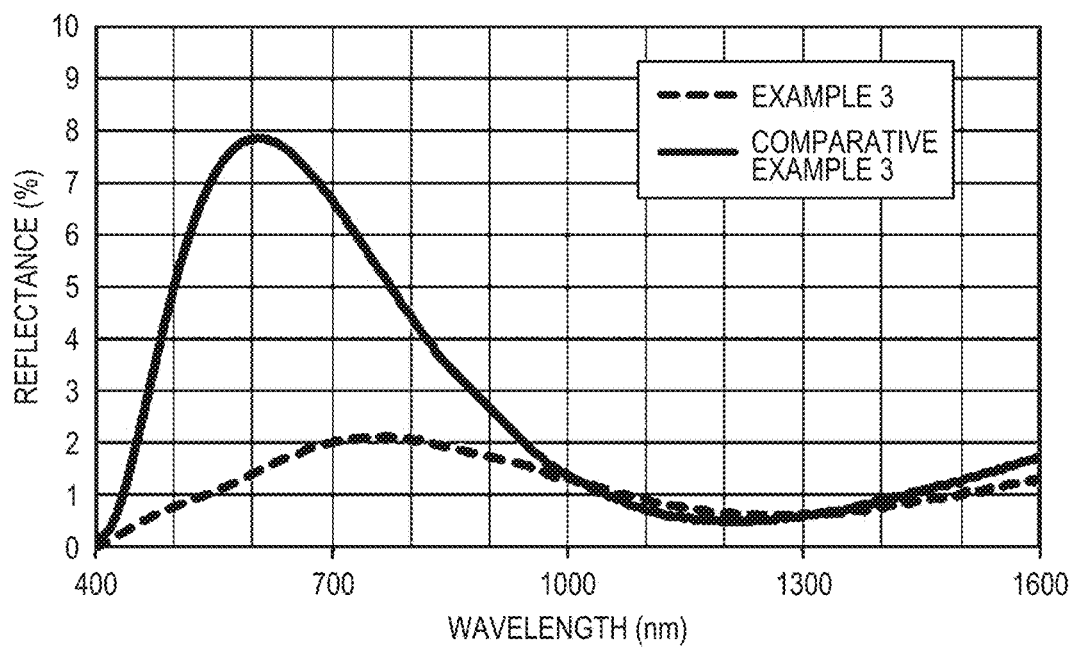
FIG. 8 is a graph for showing a relationship of the reflectance (%) of each of the optical member produced in Example 3 and Comparative Example 3 to the wavelength (nm) of light.

The reflectance measurement results of the optical member of Example 3 and the optical member of Comparative Example 3 are shown in FIG. 8. It was found that Comparative Example 3 had a poor reflectance characteristic in a visible region as compared to Example 3.

The antireflection film according to the present invention exhibits an excellent antireflection effect in a broad band. Accordingly, the antireflection film can be utilized for optical members, such as: a polarizing plate to be used for a liquid crystal display apparatus; and a sunglass lens, a prescription glass lens, a finder lens for a camera, a fly-eye lens, a toric lens, a prism, various optical filters, and a sensor, which are formed of various optical glass materials and transparent plastics. In addition, the antireflection film can be utilized for optical equipment, such as various displays of a word processor, a computer, a television, a plasma display panel, and the like, and a solar cell panel. Further, the antireflection film can be utilized for optical members of, for example, a photographing optical system, an observation optical system, such as binoculars, a projection optical system to be used for a liquid crystal projector or the like; various optical lenses, such as a scanning optical system to be used for a laser beam printer or the like; covers for various instruments; and windowpanes for an automobile, a train, and the like, which use the above-mentioned optical members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-092306, filed May 2, 2016, which is hereby incorporated by reference herein in its entirety.

What is claimed is:

1. An object, comprising:
    a substrate;
    a particle layer containing particles provided on one surface of the substrate; and
    a first plate-shaped crystal of aluminum oxide or aluminum hydroxide, or a hydrate thereof, on a surface of the particle layer that is on a side opposite to a substrate side,
    wherein the particle layer further comprises a second plate-shaped crystal of the aluminum oxide or the aluminum hydroxide, or the hydrate thereof, between the particles, and
    wherein the particles are made of a material different from the first and second plate-shaped crystals.

2. The object according to claim 1, wherein the particle layer has a thickness of 100 nm to 145 nm.

3. The object according to claim 1, wherein the particle layer contains hollow particles.

4. The object according to claim 1, wherein the particle layer contains a binder.

5. The object according to claim 1, further comprising a layer containing aluminum oxide as a main component arranged between the substrate and the particle layer.

6. The object according to claim 1, wherein the object comprises an optical member.

7. The object according to claim 1, wherein the object comprises a lens.

8. The object according to claim 1, wherein the object comprises a prism.

9. An optical apparatus, comprising an optical system comprising an optical member, the optical member comprising:
    a substrate;
    a particle layer containing particles provided on one surface of the substrate; and a first plate-shaped crystal of aluminum oxide or aluminum hydroxide, or a hydrate thereof, on a surface of the particle layer that is on a side opposite to a substrate side, wherein the particle layer further comprises a second plate-shaped crystal of the aluminum oxide or aluminum hydroxide, or the hydrate thereof, between the particles, and wherein the particles are made of a material different from the first and second plate-shaped crystals.

10. An optical apparatus according to claim 9, wherein the optical apparatus comprises a camera.

11. The object according to claim 1, wherein at least one of the first plate-shaped crystal and the second plate-shaped crystal of the aluminum oxide or the aluminum hydroxide, or the hydrate thereof, is boehmite.

12. The object according to claim 3, wherein the hollow particles are made of silicon oxide.

13. The object according to claim 9, wherein the particle layer contains hollow particles.

14. The object according to claim 13, wherein the hollow particles are made of silicon oxide.

15. The object according to claim 9, wherein at least one of the first plate-shaped crystal and the second plate-shaped crystal of the aluminum oxide or the aluminum hydroxide, or the hydrate thereof, is boehmite.

* * * * *